April 12, 1960

E. E. REED 2,932,331

LIQUID DISPENSING AND RECEIVING SYSTEM

Filed May 10, 1957

INVENTOR.
E.E. REED

BY

*Hudson and Young*

ATTORNEYS

INVENTOR.
E. E. REED

April 12, 1960 E. E. REED 2,932,331
LIQUID DISPENSING AND RECEIVING SYSTEM
Filed May 10, 1957 3 Sheets-Sheet 3

INVENTOR.
E.E. REED
BY
Hudson and Young
ATTORNEYS

United States Patent Office 2,932,331
Patented Apr. 12, 1960

2,932,331
LIQUID DISPENSING AND RECEIVING SYSTEM

Edwin E. Reed, Bartlesville, Okla., assignor to Phillips Petroleum Company, a corporation of Delaware Application May 10, 1957, Serial No. 658,302

17 Claims. (Cl. 141—192)

This invention relates to a liquid dispensing and receiving system. In one aspect this invention relates to an aircraft fueling and defueling system. In another aspect this invention relates to a pumping system wherein the operation of a plurality of pumps is controlled by demand at the dispensing point.

Over a period of years the quantities of fuel used in aircraft has increased to such proportions that transporting the fuel to the aircraft has become a problem. The familiar tank truck is no longer adequate at large airports. In large military installations the problem has become so great as to seriously hamper military operations. This has led to the development of fueling systems wherein the fuel and aircraft are brought together at a predetermined point, the fuel being piped to said point. One of the systems of the prior art is a so-called "pit" system, and while an improvement, it requires moving the aircraft to the fueling point or pit prior to takeoff, and frequently results in a long line of planes in single file proceeding to the fuel pit. In such a system if difficulty in fueling is encountered with any plane, those following it in the line are naturally delayed. To overcome such problems "hydrant" systems wherein the fuel is distributed through piping and discharged to the aircraft through one of several hydrants in the aircraft parking area have been developed.

Freedom of ground movement of the aircraft is desirable for any hydrant fueling system. It is desirable for any aircraft to be parked, moved, and fueled without dependence on any other aircraft in the parking area. Speed of fueling is also highly desirable in order to reduce holding of the plane on the ground to a minimum, and also to minimize the number of fueling personnel required. Prevention of damage to the aircraft and minimum hazard to aircraft and/or personnel are also highly desirable. This includes avoidance of fire hazards, mechanical damage to the fueling system itself, or to the aircraft, and avoidance of collision with any vehicles or other equipment used in the area.

In a desirable hydrant fueling system sufficient pumping facilities should be furnished to move the fuel to the storage tanks and finally to the hydrant outlets on the loading ramp. The pumps should be arranged with adequate controls and with sufficient flexibility to permit fueling or defueling of a single plane at a low rate or to give similar service to a number of planes at maximum rate. Adequate water separation facilities, filter facilities, and a metering system should be included. Thus, in operation, a desirable hydrant fueling system will be flexible, simple, and safe. Flexibility in flow rates, pumping, filtration, separation and aircraft parking has obvious advantages. Simplicity will minimize operational errors and maintenance requirements, and will also minimize the time required to train operating personnel. However, an oversimplified system which does not reliably control surge pressures and deliver fuel as needed is not a desirable fueling system for modern day airports.

As mentioned above, prior art hydrant fueling systems are known. However, in many instances it is desirable or necessary to defuel an aircraft. It is highly desirable that the fuel handling facilities permit both fueling and defueling of several aircraft on one distribution lateral or hydrant header at the same time without conflict of operations. It is also desirable to so arrange the accessory facilities such as pumps, meters, filters, water separators, etc. so that they can be employed to serve any one lateral or hydrant header without regard to activity on any other hydrant header in the system. The present invention provides such a fueling and defueling system.

Thus, broadly speaking, the present invention comprises a liquid dispensing and receiving system, more particularly an aircraft fueling and defueling system, possessing the above-described desirable attributes, and wherein provision is made for simultaneous fueling and defueling operations through a plurality of hydrants, each connected to a single hydrant header, and also through a plurality of hydrants, each connected to a different hydrant header.

An object of the invention is to provide a liquid dispensing and receiving system. Another object of the invention is to provide an aircraft fueling and defueling system wherein said fueling and defueling operations can be carried out simultaneously. Another object of the invention is to provide an aircraft fueling and defueling system wherein fueling and defueling operations can be carried out simultaneously through a single conduit. Still another object of the invention is to provide an aircraft fueling and defueling system wherein simultaneous fueling and defueling operations can be carried out through a plurality of hydrants, each connected to a single hydrant header, and also through a plurality of hydrants, each connected to a different hydrant header. Still another object of the invention is to provide an aircraft fueling and defueling system which is flexible, simple, and safe in operation. A still further object of the invention is to provide an aircraft fueling and defueling system wherein operational errors, maintenance requirements, and time to train operating personnel are reduced to a minimum. Still another object of the invention is to provide a pumping system employing a plurality of pumps and wherein liquid flow is controlled by demand at the dispensing point. Other aspects, objects and advantages of the invention will be apparent to those skilled in the art in view of this disclosure.

Thus, according to the invention, there is provided an aircraft fueling and defueling system comprising a supply conduit, storage tanks, a discharge conduit from said storage tanks connected to a plurality of hydrant headers, each having a plurality of outlet hydrants connected thereto, so arranged, and provided with suitable controls, to carry out simultaneous fueling and defueling operations through one or a plurality of hydrant headers.

Further according to the invention, there is provided, as a subcombination of the invention, a pumping system wherein a pressure responsive means disposed in a discharge conduit connected to the outlets of a plurality of pumps is adapted to bring a first one of said pumps into operation at a predetermined minimum pressure in said discharge conduit, and a first flow responsive means, also disposed in said discharge conduit, is adapted to maintain said first pump in operation so long as the flow through said discharge conduit is above a predetermined minimum. A second flow responsive means disposed in said discharge conduits is adapted to bring successive pumps into operation or remove successive pumps from operation responsive to flow demand through said discharge conduit.

Figure 1:
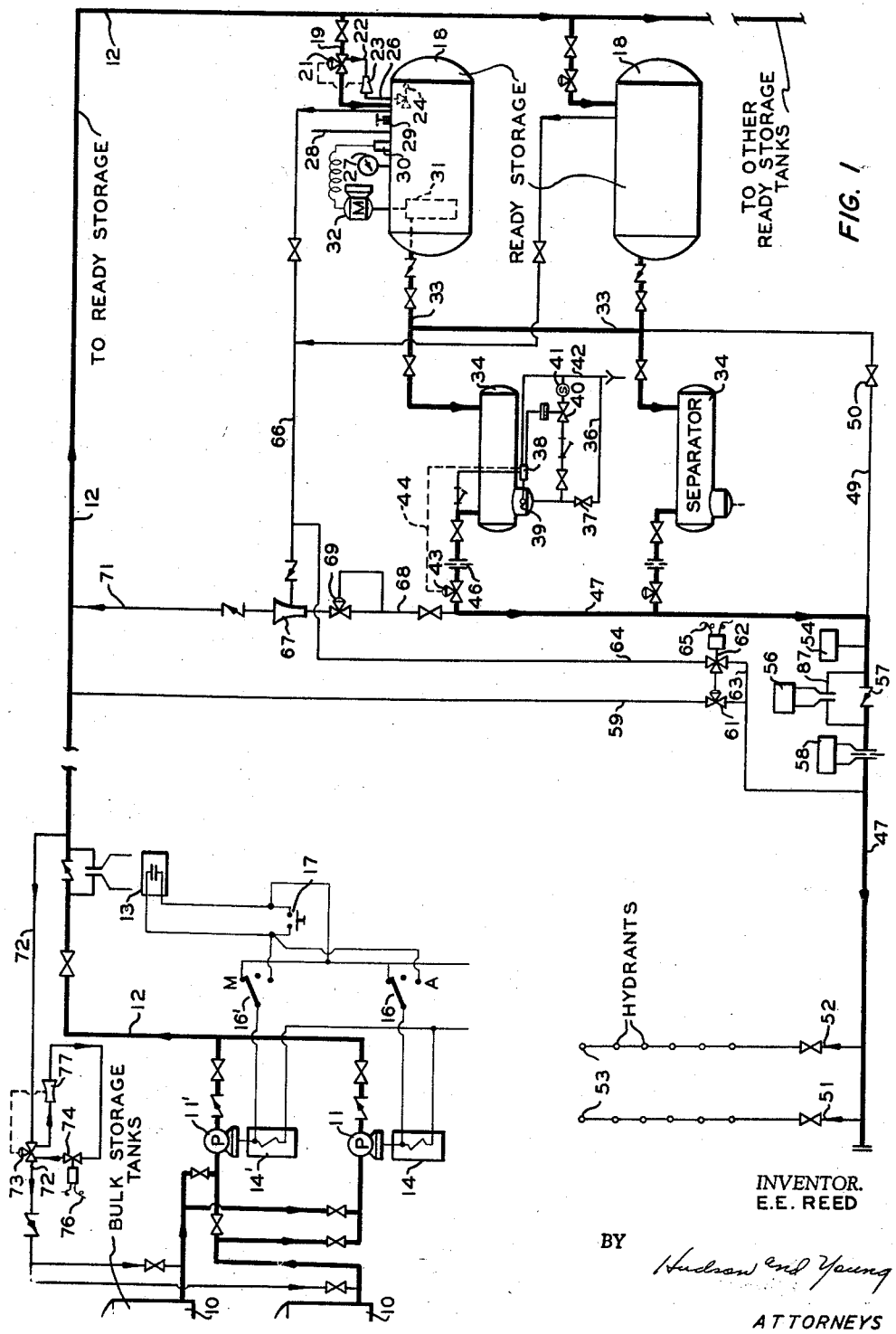
Figure 1 is a diagrammatic flow sheet illustrating schematically a fueling system of the present invention.

Referring now to the drawings wherein like numerals have been employed to designate like elements of apparatus the invention will be more fully explained. It is to be understood that said drawings are diagrammatic in nature. Many valves, pressure gages, relays, etc., not necessary for explaining the invention to those skilled in the art, have been omitted so as to simplify said drawings. All of the individual elements shown in said drawings are commercially available conventional equipment. The present invention resides in combinations and arrangements of said elements to obtain the improved results as described herein.

In Figure 1 fuel is supplied to the bulk storage tanks 10 from a fuel transportation means such as railroad tank cars, a pipe line, or tank truck, not shown. Fuel is transferred from said bulk storage tanks by means of the manifold shown and pumps 11 and 11' into main supply header 12. Transfer pumps 11 and 11' can be controlled by the flow through supply header 12 by means of differential pressure switch 13. In the control system illustrated, pump starters 14 and 14' are actuated by means of selector switches 16 and 16' respectively, when said selector switches are in the manual position M, or by said selector switches plus the circuit comprising push button 17 and differential switch 13 when said selector switches are in the automatic position A. With the switches in manual position M pumps 11 and 11' can be employed to transfer among the bulk storage tanks, from a tank car, or to the ready storage tanks 18 described hereinafter. When the selector switches are in automatic position A, transfer pumps 11 and 11' are employed to supply fuel to said ready storage tanks. To actuate said pumps for this latter service push button 17 is closed, thus energizing one or both of starters 14 and 14', as needed, and starting the pumps. Said push button releases after a predetermined time interval during which the flow through supply conduit 12 will have reached an amount sufficient to actuate differential pressure switch 13, which is in parallel with push button 17, and complete the circuit to the motors driving said pumps, thus keeping said pumps operating. When the ready storage tanks are full, the valves in the inlets to these tanks close automatically, as described further hereinafter, thus stopping flow in supply header 12 which will cause differential pressure switch 13 to open and stop pumps 11 and 11'.

Fuel from supply header 12 enters ready storage tank 18 via inlet 19 having control valve 21 therein. Said control valve 21 is an automatically operating float controlled valve which closes at a predetermined high level in tank 18. In operation, a portion of the fuel flowing through inlet 19 passes through conduit 22 and venturi 23 into said tank 18. Flow of fuel through venturi 23 reduces the pressure above the diaphragm of valve 21 and causes said valve to open. Upon reaching a predetermined high level in tank 18, float 24 closes the valve on the end of conduit 26 thus stopping flow through venturi 23 and valve 21 will be closed. Valve 21 is a conventional piece of equipment available commercially. Any suitable type of float controlled, high level valve, or other means for stopping flow into tank 18 responsive to a high level therein can be employed.

It will be understood that tank 18 is only one tank of a group of ready storage tanks of which only two are here shown. All of said tanks are equipped the same as tank 18 is equipped and the operation of all is the same. It will be understood that the invention is not limited to any particular number of ready storage tanks, or groups of ready storage tanks because as is obvious from the drawing, supply header 12 can be extended to accommodate any number of tanks. It is usually preferable to arrange said ready storage tanks in groups of about 6 in number. However, said groups can be larger or smaller. It is one of the features of the invention that the fueling and defueling system can be installed incrementally.

Tank 18 is supplied with a pressure gage 27, a vent 28, a gage hatch 29, and a low-level pump control 30. A well-type pump 31 is mounted within said tank and is operated by motor 32. Fuel is transferred from the outlet of said pump through discharge conduit 33 into fuel-water separator 34. Said separator 34 is provided with manual water draw-off 36 controlled by valve 37 which is normally closed. Liquid level control 38, actuated by float 39, controls the operation of motor valve 40 in a conventional manner to permit the withdrawal of water through sight glass 41 and conduit 42. Said level controller 38 will also actuate flow control valve 43 by means of control conduit 44 and close said valve 43 if for some reason an abnormally high level of water builds up in separator 44. If desired, a rate of flow recorder can be installed at orifice 46.

Fuel is withdrawn from said separator 34 through conduit 47 and passed into hydrant headers 51 and 52 which are each supplied with a plurality of hydrants 53. Although only two hydrant headers are shown it will be understood that any number of said headers can be employed. In military installations it is usually desirable that said hydrant headers be placed relatively close to each other in what is designated as a parking area. However, it is within the scope of the invention for said hydrant headers to be placed so as to supply a group of parking stations as at a civilian airport and planes could be fueled from hydrants at the same parking stations where the passengers unload. If it is desired or necessary to bypass separators 34 bypass conduit 49 having valve 50 therein is provided between conduits 33 and 47. Conduit 33 and conduit 47 together with separator 34, or conduit 33 and conduit 49, are referred to herein and in the claims as a discharge conduit.

Pressure switch 54, differential pressure switch 56, spring loaded check valve 57, and flow transmitter 58 comprise the system of control for pumps 32 on storage tanks 18. Said system of pump control is described in connection with Figure 2.

A third conduit 59 extends from a point in conduit 47 downstream of flow transmitter 58 to supply conduit 12. A pressure responsive valve 61 is disposed in said conduit 59. A three port, two position solenoid valve 62 is provided to switch the pressure sensing point of said valve 61 from control conduit 63 to control conduit 64 depending upon whether or not pumps 31 are operating. Lead wires 65 from said solenoid valve are connected into the power supply for the motor 32 on pumps 31 and when said pumps are operating, the solenoid is actuated to switch the control of valve 61 to control conduit 64. When said pumps are not operating, the control of valve 61 is through control conduit 63 and said valve is thus responsive to the pressure in conduit 47. Control conduit 64 is connected into siphon conduit 66 which in turn extends into ready storage tanks 18. The discharge end of conduit 66 is connected into the throat of venturi 67. Thus, when fuel is being transferred through conduit 47, a small portion thereof is passed via conduit 68 through pressure responsive regulator valve 69 into venturi 67. Flow of said fuel through venturi 67 creates suction in conduit 66 and it is thus possible to maintain the same level in all of ready storage tanks 18. Discharge from venturi 37 is via conduit 71 into supply conduit 12. Since conduit 66 is always a low-pressure conduit, valve 61 will always remain closed when pumps 31 are in operation.

A by-pass conduit 72 is provided to by-pass bulk transfer pumps 11 and 11'. Said conduit extends from the downstream side of pressure differential switch 13 to the manifold header of bulk storage tanks 10 as shown. Disposed in said conduit 72 is a by-pass control valve 73. Said valve 73 is a commercially available diaphragm type valve and is normally closed when pumps 11 and 11' are operating. When said pumps are not operating solenoid valve 74, having lead wires 76 thereto connected into the transfer pump power circuit, is open. Under these conditions, flow is permitted through venturi 77, as shown, which flow reduces the pressure above the diaphragm in valve 73 causing said valve 73 to open.

Conduit 59, controlled by control valve 61, and by-pass 72, controlled by control valve 73, make possible the return of fuel which is being defueled from an aircraft to either the ready storage area or the bulk storage tanks as is explained further hereinafter.

Figure 2:
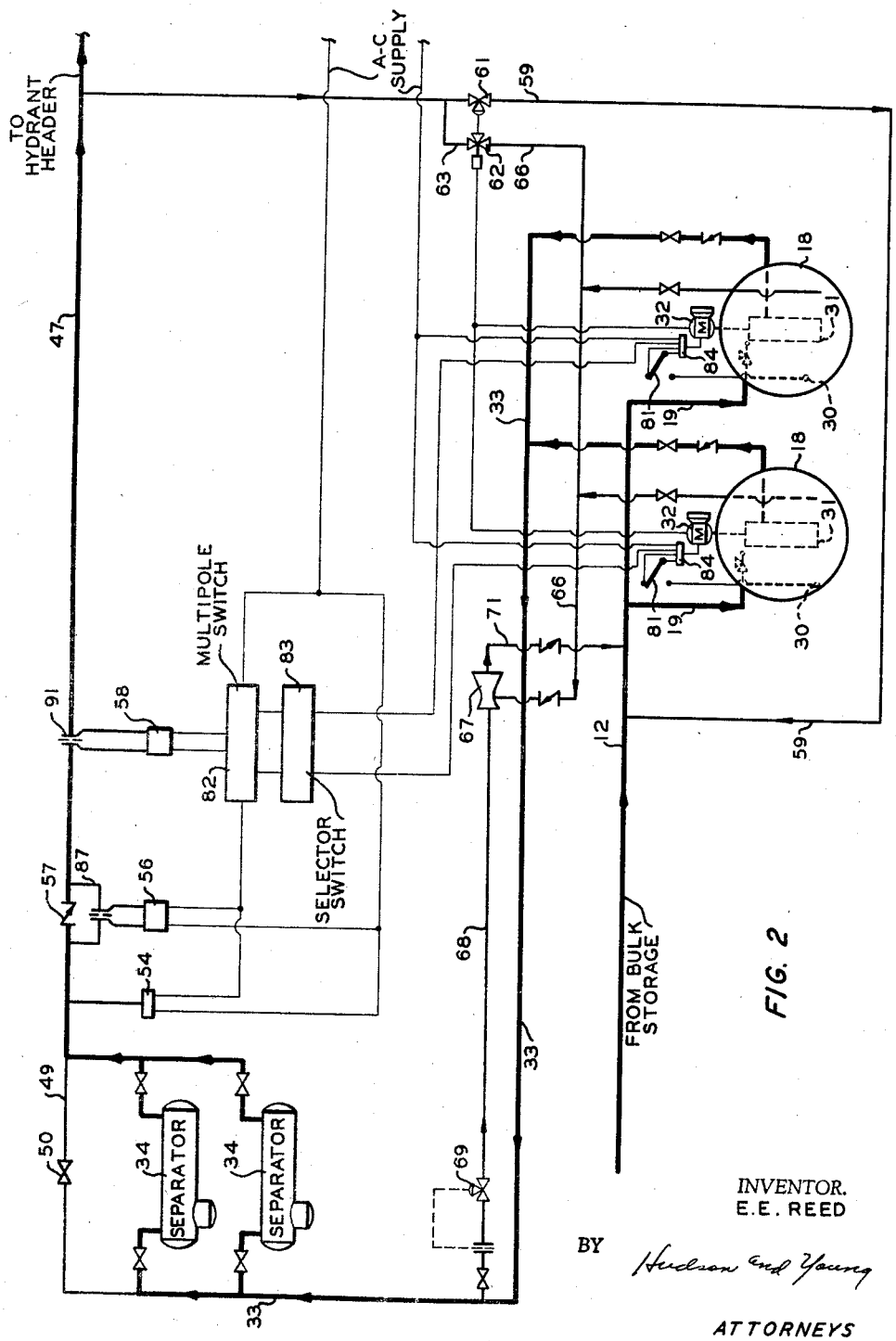
Figure 2 is a diagrammatic illustration of the pumping system of the invention.

Referring to Figure 2 there is illustrated the pump control system of the invention. When a demand for fuel develops at one of the hydrants 53 on the downstream end of conduit 47, pressure in said conduit 47 decreases and pressure switch 54 closes and completes a circuit through multipole switch 82 and selector switch 83 to the holding coil of one of the pump starters 84. Said selector switch 83 permits the operator to select which pump will start first. When the pump starts, spring loaded check valve 57 causes the flow to pass through orifice by-pass 87. The orifice in said by-pass 87 is so sized that a small flow, such as 5–10 g.p.m., will cause differential pressure switch 56, which is connected across said orifice, to close and maintain said circuit through multipole switch 82 and selector switch 83 to starter 84 of the pump motor. Said pressure differential switch 56 is a conventional piece of equipment and operates responsive to the difference in pressure across the orifice in known conventional manner to transmit a signal to a relay which in turn maintains said circuit. It will be noted that pressure switch 54 and pressure differential switch 56 are connected in parallel in said circuit. Spring loaded check valve 57 will open only at a higher pressure than that required to close differential pressure switch 56. The orifice in by-pass 87 and said spring loaded check valve 57 are placed in parallel so that the system will be sensitive to extremely small flows but yet not cause excessive pressure drop at high flow rates.

As the demand for fuel increases, it will approach the capacity of one pump. At this time, rate of flow transmitter 58 positioned downstream from check valve 57 senses the increased demand through orifice 91 and transmits a signal in known conventional manner to multipole switch 82. Multipole switch 82 will then rotate sufficiently to complete a second circuit from the power supply through said multiple switch and selector switch 83 to the holding coil 84 of a second pump starter. In a similar manner succeeding pumps will be started as described. Multipole switch 82 and selector switch 83 are conventional pieces of apparatus available commercially and operate in known conventional manner.

As the demand for fuel at the hydrant header decreases to less than the capacity of the pumps operating, said decrease in demand will be sensed by rate of flow transmitter 58 which will actuate multipole switch 82 and cause the circuits to the pumps to be broken, thus shutting down said pumps in reverse order from which they started. As said demand decreases to zero, spring loaded check valve 57 will close and flow through by-pass 87 decreases, which decrease will cause pressure differential switch 56 to open and break the circuit to the motor of the last pump in operation. At this time, the sensing point of valve 61 in conduit 59 will be switched from siphon conduit 66 by means of solenoid valve 62 to control conduit 63 which will permit the pressure in the system to bleed down through conduit 59 into supply conduit 12.

Low level control 30 actuates switch 81 to open the circuit to holding coil 84 at a predetermined low level in tanks 18 thus stopping the pump and preventing pump operation. Said low level control 30 can be any suitable conventional piece of equipment which will operate to shut down pump 32 responsive to a low level in tank 18.

Figure 3:
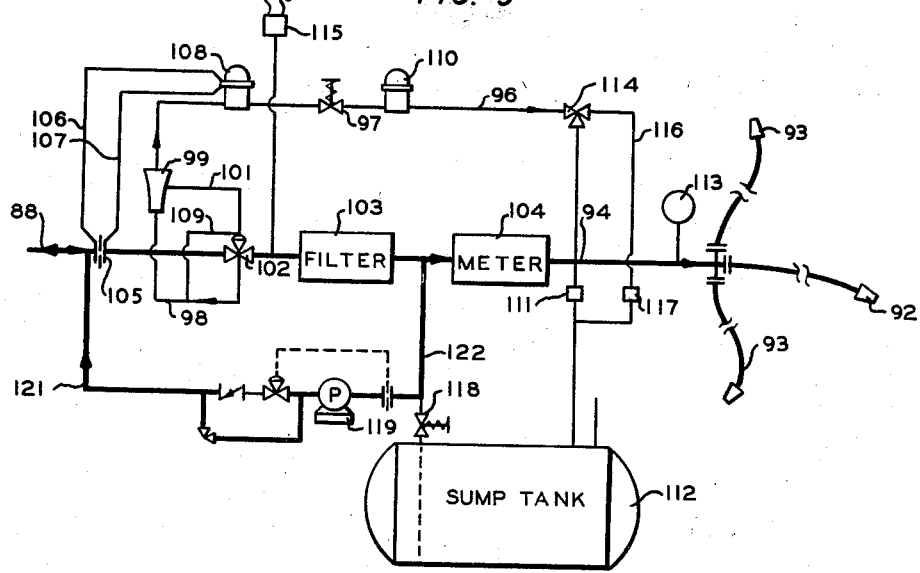
Figure 3 is a diagrammatic illustration of one combination of apparatus which can be employed in the fueling and defueling system of the invention for connecting an aircraft or other vehicle to the fueling system hydrant.
Figure 4:
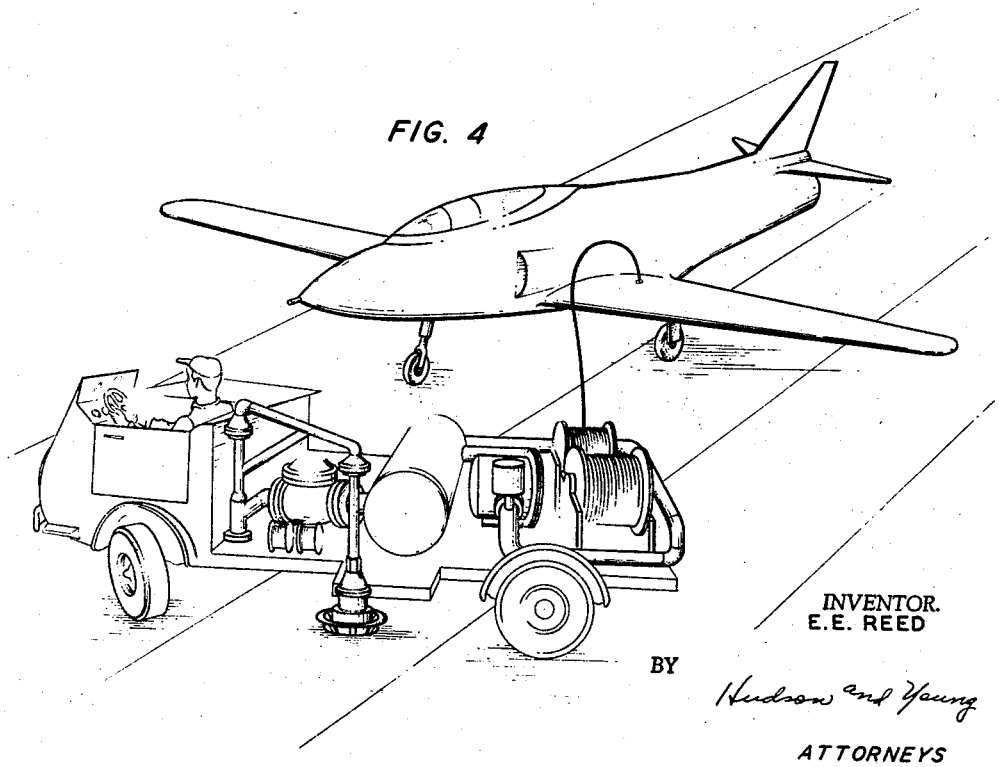
Figure 4 is a perspective view illustrating a mobile unit having the combination of apparatus illustrated in Figure 3 mounted thereon, and showing the relation between the fueling system hydrant, said combination of apparatus, and an aircraft.

Figure 3 illustrates one combination of apparatus which can be employed on the loading ramp or at the parking station between hydrants 53 and the aircraft to be fueled or defueled. All of the equipment illustrated in Figure 3 is mounted on a mobile unit as illustrated in Figure 4. When it is desired to fuel an aircraft said mobile unit is connected at 88 to one of the hydrants 53 on the loading ramp and to the aircraft by means of single point hose 92 or one of the over the wing hoses 93. When the valve on the outlet on the hose being employed is opened, pressure drops in dispensing conduit 94 and thus in control conduit 96. At this time dead man valve 97 is opened, permitting flow through conduit 98 and through said control conduit 96. Said flow is through venturi 99 and thus reduces the pressure in conduit 101 connected above the diaphragm in control valve 102 which causes said valve 102 to open and permit flow through filter 103 and meter 104 to the aircraft. Pilot pressure regulator 110 senses the pressure in conduit 94 downstream of meter 104 and regulates said pressure by permitting more flow through conduit 96 when the pressure is low in conduit 94. This will in turn increase the flow through valve 102. Conversely if the pressure in conduit 94 is higher than the desired operating pressure regulator 110 will decrease the flow through conduit 96 which will also decrease flow through 94. However, if the flow through conduit 94 to the aircraft exceeds a predetermined maximum, the differential pressure across orifice 105 transmitted through control conduits 106 and 107 will actuate regulator valve 108 to close control conduit 96 and thus allow upstream pressure to enter the diaphragm chamber of valve 102 via conduit 109 and thus cause said valve 102 to be throttled, or in extreme cases closed. Similarly, if dead man valve 97 is released it closes automatically and thus causes valve 102 to close. An excess of pressure in the dispensing conduit 94 will bleed through hydrostatic release valve 111 into sump tank 112. Surge suppressor 113 is provided to take care of surges in pressure in dispensing conduit 94 and thus protect equipment on the aircraft being fueled and the equipment on said mobile unit. Normally, when the fuel dispensing operation ceases, three-way valve 114 is manually switched to connect dispensing conduit 94 with bleed conduit 116 which will permit the excess pressure to bleed through low pressure regulator 117 into said sump tank 112. In this manner, pressure is removed from the dispensing hoses facilitating their removal from the aircraft. Sump tank 112 can be pumped out by holding valve 118 open manually and starting pump 119 which is driven by the vehicle motor by means not shown. The fuel in said sump tank is transferred through conduit 121 into conduit 88 which is connected to one of hydrants 53.

Pressure switch 115 responsive to a predetermined minimum pressure in conduit 94 breaks the ignition circuit of the fueling vehicle during fueling operations.

When it is desired to defuel an aircraft, connection to a hydrant 53 and one of the hoses to the aircraft is made as described above and defuel pump 119 is started. Said pump takes suction from the aircraft tanks and moves the fuel through conduit 94, meter 104, and conduit 122 and discharges it through conduit 121 into conduit 88. Said fuel is thus removed from the plane and returned to hydrant header 51 or 52. If another aircraft is being fueled at this time on one of said hydrant headers, the fuel being defueled will go to said aircraft. If the total amount of defueled fuel at any one time exceeds the amount of fuel required for fueling operations, the excess will be returned via conduit 59 to supply conduit 12 from which it will flow into one of ready storage tanks 18. The return of the excess defueled fuel through conduit 59 is made possible by the operation of valve 61. When the defueled fuel becomes excessive, pressure in conduit 47 builds up and positive flow therethrough will be stopped, causing flow transmitter 58 and pressure differential switch 56 to stop pumps 31. When the power supplied to said pumps 31 is interrupted, solenoid valve 62 is actuated to switch the sensing point of valve 61 to control conduit 63. Said valve 61 will then open at a predetermined maximum pressure to permit the excess defueled fuel to flow through conduit 59. If ready storage tanks 18 are full and valves 21 are closed, said excess fuel will be returned via supply conduit 12 into by-pass conduit 72. If transfer pumps 11 or 11' are operating, the excess fuel in supply conduit 12 will cause flow in said conduit 12 to stop, and pressure differential switch 13 will stop said pumps 11 and 11'. Solenoid valve 74 will then be opened to permit flow through by-pass conduit 72 as previously described. The system thus provides means for simultaneous fueling and defueling operations to be carried out through a plurality of hydrant headers. The extreme flexibility of the system is illustrated by the fact that when defueled fuel becomes excessive it can go to either the ready storage tanks or the bulk storage tanks. Normally said excess defueled fuel will go to the ready storage tanks 18 if they are not full because the resistance to flow is less in that direction. Said tanks 18 are usually buried at the edge of the airport whereas bulk storage tanks are usually not buried and are generally at a considerable distance from the airport.

The system of the invention provides extreme flexibility. Any type of aircraft can be fueled without change of equipment. Fuel flow to a single aircraft could vary from zero to any predetermined maximum, dependent only upon the ability of the aircraft to receive the fuel. Fueling or defueling can take place at any hydrant without regard to operations at any other hydrant. Any pump can be removed from service without reducing the amount of ready storage available.

Any separator removed from service for maintenance would effect only the peak flow available. In military installations, if a ready storage group was damaged so that it could not supply fuel, and all or part of the ramp it serves was not damaged, this ramp area could be served from an adjacent ready storage group as long as the fuel header connecting the groups was intact.

Advantages of the fueling system are many. The simple automatic controls located at the pumps eliminate the need for carrying any electrical circuits out to the hydrant locations, and eliminate the need for communications between the pump location and the hydrant. Maintaining the system under pressure minimizes the possibility of fuel contamination. Fueling or defueling can be carried on at any hydrant without regard to the operation being performed at any other hydrant. The apron layout can be varied to provide efficient parking and servicing of any type of aircraft.

The simplified piping and controls and the elimination of under-the-ramp electrical circuit reduce maintenance to a minimum. No pits are required, since all control equipment is located at either ready storage or on the fueling vehicle. Leak detection is simplified since the system is always under pressure and any pressure loss when no fueling was being done would indicate leakage. In addition, existing hydrant fueling systems could be readily converted to this system.

While the invention has been described in terms of the fueling and defueling of aircraft it will be understood by those skilled in the art that the invention is not so limited. The invention can be applied in a like manner to the fueling and/or defueling of any other type vehicles. For example, it can be employed at large bulk stations to load and unload transport trucks hauling fuel from said bulk station.

Further details regarding the combination of apparatus illustrated in Figures 3 and 4 can be found in copending application Serial No. 683,623, filed September 11, 1957, by E. E. Reed and A. F. Dyer, where said combination of apparatus is disclosed and claimed. A presently more preferred modification of said combination of apparatus is also disclosed and claimed in said copending application.

Various other modifications of the invention can be made or followed in view of the above disclosure, without departing from the spirit or scope of the invention, as will be apparent to those skilled in the art.

I claim:

1. In liquid dispensing and receiving apparatus, the combination of: a storage tank; a supply conduit connected to an inlet to said tank for filling said tank; a hydrant header having a plurality of hydrants connected thereto; a discharge conduit extending between an outlet on said tank and said hydrant header; pump means for transferring liquid from said tank through said discharge conduit to said hydrant header; pump control means in said discharge conduit; a third conduit extending from said supply conduit to a point in said discharge conduit downstream of said pump control means; a valve in said third conduit; means for biasing said valve in closed position; pressure responsive means for overcoming said biasing means; and means for connecting said pressure responsive means to said discharge conduit when said pump is not operating and disconnecting said pressure responsive means from said discharge conduit concurrently with starting of said pump.

2. The combination of claim 1 wherein said valve is a pressure responsive motor valve adapted to open at a predetermined maximum pressure, and said means for connecting and disconnecting said pressure responsive means comprises means for switching the pressure sensing conduit of said valve into communication with a low pressure conduit while said pump means is operating and into communication with said discharge conduit when said pump means is not operating.

3. In liquid dispensing and receiving apparatus, the combination of: a first storage tank; a second storage tank; a supply conduit extending between said first and second tanks; first pump means disposed in said supply conduit for pumping liquid from said first tank to said second tank; a hydrant header having a plurality of hydrants connected thereto; a discharge conduit extending between said hydrant header and said second storage tank; a second pump means for pumping liquid from said second tank to said hydrant header; pump control means in said discharge conduit; a third conduit extending from a point in said supply conduit upstream of said second tank to a point in said discharge conduit downstream of said pump control means; a valve in said third conduit; means for biasing said valve in closed position; pressure responsive means for overcoming said biasing means; and means for connecting said pressure responsive means to said discharge conduit when said pump is not operating and disconnecting said pressure responsive means from said discharge conduit concurrently with starting of said pump.

4. In liquid dispensing and receiving apparatus, the combination of: a first storage tank; a second storage tank; a supply conduit extending between said first and second tanks; first pump means disposed in said supply conduit for pumping liquid from said first tank to said second tank; a by-pass conduit connected into said supply conduit around said first pump means; a normally closed first valve in said by-pass conduit; means responsive to flow in said by-pass conduit for biasing said first valve to an open position when said first pump means is not operating; a hydrant header having a plurality of hydrants connected thereto; a discharge conduit extending between said hydrant header and said second storage tank; a second pump means for pumping liquid from said second tank to said hydrant header; pump control means in said discharge conduit; a third conduit extending from a point in said supply conduit upstream of said second tank to a point in said discharge conduit downstream of said pump control means; a second valve in said third conduit; means for biasing said second valve in closed position; pressure responsive means for overcoming said biasing means; and means for connecting said pressure responsive means to said discharge conduit when said pump is not operating and disconnecting said pressure responsive means from said discharge conduit concurrently with starting of said pump.

5. The combination of claim 4 wherein said second valve comprises a pressure responsive motor valve adapted to open at a predetermined maximum pressure, and said means for connecting and disconnecting said pressure responsive means comprises means for switching the control conduit of said motor valve into communication with a low pressure conduit while said second pump means is operating and into communication with said discharge conduit when said second pump means is not operating.

6. The combination of claim 4 wherein said first valve comprises a pressure responsive motor valve and said biasing means therefor comprises: a conduit connected at one end to the upstream side of said valve and at the other end to the downstream side of said valve; a venturi in said conduit; a control conduit extending from the throat of said venturi to above the diaphragm in said motor valve; and a solenoid valve in said conduit, said solenoid valve being operatively connected to a power circuit supplying power for a motor driving said first pump means and adapted to be in open position when said first pump means is not operating, and vice versa.

7. The combination of claim 1 wherein said storage tank is a plurality of storage tanks, said supply conduit is connected to an inlet on each tank, said discharge conduit is connected to an outlet from each tank, and wherein there is provided in further combination: a siphon conduit extending from within each of said tanks to the throat of a venturi, the inlet to said venturi being connected to said discharge conduit, and the outlet of said venturi being connected to said supply conduit.

8. The combination of claim 7 wherein said valve comprises a pressure responsive motor valve adapted to open at a predetermined maximum pressure and said means for connecting and disconnecting said pressure responsive means comprises a two-position solenoid valve operatively connected to said motor valve and to a power circuit supplying power for a motor driving said pump means, said solenoid valve being adapted to switch the control conduit of said motor valve into communication with said siphon conduit while said pump means is operating and into communication with said discharge conduit when said pump means is not operating.

9. The combination of claim 4 wherein said second storage tank comprises a plurality of storage tanks, said supply conduit is connected to an inlet on each tank, said discharge conduit is connected to an outlet from each tank, and wherein there is provided in further combination; a siphon conduit extending from within each of said second tanks to the throat of a venturi, the inlet to said venturi being connected to said discharge conduit and the outlet of said venturi being connected to said supply conduit.

10. The combination of claim 9 wherein said second valve comprises a pressure responsive motor valve adapted to open at a predetermined maximum pressure and said means for connecting and disconnecting said pressure responsive means comprises a two-position solenoid valve operatively connected to said motor valve and to a power circuit supplying power for a motor driving said second pump means, said solenoid valve being adapted to switch the control conduit of said motor valve into communication with said siphon conduit while said second pump means is operating and into communication with said discharge conduit when said second pump means is not operating.

11. An aircraft fueling and defueling system comprising, in combination: a plurality of fuel storage tanks; a supply conduit connected to an inlet on each tank for filling said tank; a plurality of hydrant headers each having a plurality of hydrants connected thereto; a discharge conduit extending from an outlet on each of said tanks and connected to each of said hydrant headers; pump means at each tank for transferring fuel from said tank through said discharge conduit to said hydrant headers; pump control means disposed in said discharge conduit, said pump control means being operatively connected to each pump and adapted to start and stop said pumps successively responsive to flow in said discharge conduit; a third conduit extending from said supply conduit to a point in said discharge conduit downstream from said pump control means; a valve in said third conduit having means for biasing it closed and pressure responsive means for overcoming said biasing means and opening said valve at a predetermined maximum pressure; a pressure sensing conduit connected to said pressure responsive means; means for switching the pressure sensing conduit into communication with a low pressure conduit so as to bias said valve to a closed position when at least one of said pumps is operating, and into communication with said discharge conduit when none of said pumps are operating; means for connecting each hydrant individually to an aircraft; and means for pumping fuel from an aircraft through a hydrant and hydrant header to which it is connected into said discharge conduit; said pump control means being adapted to stop said pumps, and said pressure responsive valve being adapted to open and permit flow of fuel from said discharge conduit through said third conduit and into said supply conduit when the amount of fuel being defueled from an aircraft exceeds the amount of fuel needed for aircraft fueling operations.

12. The combination of claim 11 wherein: a fuel-water separator means is disposed in and forms a part of said discharge conduit; said low pressure conduit is a siphon conduit extending from within each of said tanks to the throat of a venturi, the inlet to said venturi being connected to said discharge conduit and the outlet of said venturi being connected to said supply conduit; and said pump control means is positioned downstream of said fuel-water separator means.

13. An aircraft fueling and defueling system comprising, in combination: a plurality of first storage tanks; a plurality of second storage tanks; a supply conduit extending from an outlet on each of said first storage tanks to an inlet on each of said second storage tanks; first pump means disposed in said supply conduit for pumping fuel from said first storage tanks to said second storage tanks; a by-pass conduit connected into said supply conduit around said first pump means; a normally closed first valve in said by-pass conduit; means responsive to flow in said by-pass conduit for biasing said first valve to an open position when said first pump means is not operating; a plurality of hydrant headers each having a plurality of hydrants connected thereto; a discharge conduit extending from an outlet on each of said second storage tanks and connected to each of said hydrant headers; pump means at each of said second storage tanks for transferring fuel therefrom through said discharge conduit to said hydrant headers; pump control means disposed in said discharge conduit, said pump control means being operatively connected to each pump of said second storage tanks and adapted to start and stop said pumps successively responsive to flow in said discharge conduit; a third conduit extending from said supply conduit to a point in said discharge conduit downstream from said pump control means; a second valve in said third conduit having means for biasing it closed and pressure responsive means for overcoming said biasing means and opening said second valve at a predetermined maximum pressure; a pressure sensing conduit connected to said pressure responsive means; means for switching the pressure sensing conduit into communication with a low pressure conduit so as to bias said second valve to a closed position when at least one of said pumps is operating, and into communication with said discharge conduit when none of said pumps are operating; means for connecting each hydrant individually to an aircraft; and means for pumping fuel from an aircraft through a hydrant and hydrant header to which it is connected into said discharge conduit; said pump control means being adapted to stop said pump means of said second storage tanks, and said second valve being adapted to open and permit flow of fuel from said discharge conduit through said third conduit and into said supply conduit when the amount of fuel being defueled from an aircraft exceeds the amount of fuel needed for aircraft fueling operations.

14. The combination of claim 13 wherein: a fuel-water separator means is disposed in and forms a part of said discharge conduit; said low pressure conduit is a siphon conduit extending from within each of said second storage tanks into throat of a venturi, the inlet to said venturi being connected to said discharge conduit, and the outlet of said venturi being connected to said supply conduit; and said pump control means being positioned downstream of said fuel-water separator means.

15. A pumping system comprising, in combination a plurality of pumps; a discharge conduit connected to the outlets of said pumps and terminating in valved dispensing means; pressure responsive means disposed in said discharge conduit and adapted to bring a first one of said pumps into operation at a predetermined minimum pressure in said discharge conduit; a first flow responsive means disposed in said discharge conduit for maintaining said first pump in operation responsive to a predetermined minimum flow; and a second flow responsive means disposed in said discharge conduit for bringing additional pumps into operation successively responsive to increased flow demand through said discharge conduit.

16. A pumping system comprising, in combination: a plurality of pumps; a discharge conduit connected to the outlets of said pumps and terminating in valved dispensing means; a pressure switch connected to a source of power and adapted to complete a first power circuit from said source of power to a first one of said pumps and bring said first pump into operation responsive to a predetermined minimum pressure in said conduit; a first flow responsive means disposed in said conduit and connected in parallel with said pressure switch in said first power circuit for maintaining said first pump in operation so long as flow in said conduit is above a predetermined minimum; and a second flow responsive means disposed in said conduit, downstream of said first flow responsive means, adapted to (1) complete additional power circuits from said source of power and bring additional of said pumps into operation successively responsive to predetermined increases in flow through said conduit, and (2) open said additional power circuits and remove said additional pumps from operation successively responsive to predetermined decreases in flow through said conduit.

17. The combination of claim 15 wherein said first flow responsive means comprises: a check valve biased to prevent flow through said discharge conduit below a predetermined minimum pressure; a by-pass conduit connected into said discharge conduit upstream and downstream of said check valve; a first orifice in said by-pass conduit; and a pressure differential switch connected across said first orifice, in parallel with said pressure switch in said first power circuit, and adapted to be closed at a lower pressure differential than that required to open said check valve; and wherein said second flow responsive means comprises; a second orifice in said discharge conduit; a rate of flow transmitter connected across said orifice; a rotatable multipole switch operatively connected to said rate of flow transmitter and said power source, said multipole switch being adapted to rotate responsive to said rate of flow transmitter to (1) complete and (2) open said additional circuits.

References Cited in the file of this patent

UNITED STATES PATENTS

| | | |
|---|---|---|
| 868,464 | Mann | Oct. 15, 1907 |
| 2,741,986 | Smith | Apr. 17, 1956 |
| 2,747,598 | Wooldridge | May 29, 1956 |
| 2,797,846 | Reed | July 2, 1957 |
| 2,812,111 | Wright | Nov. 5, 1957 |

FOREIGN PATENTS

| | | |
|---|---|---|
| 430,701 | France | Aug. 19, 1911 |